United States Patent Office 3,188,330
Patented June 8, 1965

3,188,330
PROCESS FOR PREPARING ESTERS AND KETONES FROM ALCOHOLS
Arthur C. Hecker, Forest Hills, and Mark W. Pollock, Bronx, N.Y., assignors to Argus Chemical Corporation, Brooklyn, N.Y., a corporation of New York
No Drawing. Filed July 12, 1961, Ser. No. 123,437
9 Claims. (Cl. 260—410.6)

This invention relates to a process for preparing esters and ketones from alcohols directly, by dehydrogenation with the aid of a catalyst not previously known to effect dehydrogenation, and more particularly to a process for preparing esters and ketones from primary and secondary alcohols, respectively, in the presence of a salt of an organic acid and a metal of Group IIB of the Periodic Table, and particularly cadmium or zinc.

The preparation of an ester starting from an alcohol requires at least two steps which are carried out in sequence: first, oxidation of the alcohol to the acid; and second, reaction of the acid with the alcohol to form the ester. If the acid, acid chloride or acid anhydride is available, the alcohol can, of course, be reacted directly with one of these reactants to form the ester, desirably in the presence of an acid catalyst. However, the acid or its chloride or anhydride are generally more expensive than the alcohol, and in any case its use means that an additional reactant is required.

It is possible to oxidize primary alcohols to aldehydes in the presence of a copper catalyst, with liberation of hydrogen gas, and with some difficulty aldehydes have been reacted in the presence of aluminum alkoxide catalyst to form esters. Here, again, two stages and two different catalysts are required to convert the alcohol to the ester.

In accordance with the invention, alcohols having one or two labile hydrogen atoms on the carbon atom bearing the hydroxyl group are converted in a one step reaction to ketones or esters, respectively, by reaction in the presence of a salt of an organic acid and a metal of Group IIB of the Periodic Table, preferably, cadmium or zinc. Hydrogen is liberated in the course of the reaction, and a portion of the metal of the catalyst is reduced to the free metal, probably by way of a side reaction with hydrogen, because the major proportion of catalyst is unchanged, and can be reused.

In the case of primary alcohols, the overall reaction proceeds as follows:

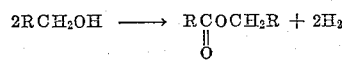

In one mole of the alcohol, the two hydrogens of the carbon bearing the hydroxyl group are replaced by oxygen, and the resulting radical is found attached to another mole of alcohol in the final ester. The reaction can be characterized as a dehydrogenation, due to the loss of two hydrogen atoms from one mole of alcohol, and this is verified by the liberation of hydrogen gas in an amount of roughly one mole per mole of ester produced.

In the case of a secondary alcohol, the reaction proceeds as follows:

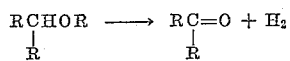

In this case, a ketone is formed, by direct dehydrogenation.

The reaction mechanism for the formation of esters has not been established, but may involve dehydrogenation of the alcohol to the aldehyde, which then undergoes a kind of Cannizzaro reaction, regenerating the alcohol and forming an equal molar ratio of acid, according to the following reactions:

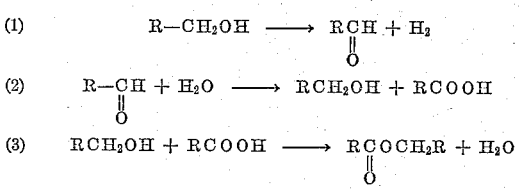

Aliphatic aldehydes do not generally undergo the Cannizzaro reaction, but a catalyst formed in situ from the acid salt of course could be responsible for an exception to the rule, as well as formation of the ester. Enough water and catalyst, the structure of which is unknown, for initiation of the Cannizzaro reaction is probably formed in the reduction of the salt to the metal. Once started, the reaction can continue because water is regenerated in the esterification. The fact is that no water need be added to the reaction mixture.

The necessity for some water and the catalyst of unknown structure, formed in situ in the reaction, substantiating the Cannizzaro reaction theory, has been verified by starting with the aldehyde, and the acid salt catalyst. The aldehyde cannot dehydrogenate, and water cannot be evolved by reduction of salt to metal, nor can the unknown catalyst be formed. Consequently, as expected, only very small amounts of ester are formed, due probably to wet reactants or atmospheric water entering the reacting mixture.

Esters are obtained from any primary alcohol of the formula $RCH_2OH$, wherein R is a straight or branched chain alkyl group, or an aryl, alkylaryl, arylalkyl, cycloalkyl or heterocyclic radical. In general, R will contain from one to about fifty carbon atoms, but there is no real upper limit on the size of the molecule, inasmuch as the reaction ocurrs at the $CH_2OH$ group.

The process is applicable not only to monohydric alcohols but also to polyhydric alcohols, such as the glycols and higher polyhydric alcohols, so that R can contain additional primary hydroxyl groups. If two or more primary alcohol groups are present, a polymeric ester can be formed. Glycols produce a linear polyester having repeating alcohol and acid units . Polyhydric alcohols containing three or more primary alcohol groups such as pentaerythritol and trimethylolpropane, form three dimensional or cage type polymers.

Exemplary primary alcohols include ethanol, 1-propanol, 2-propanol, 1-butanol, 2-butanol, 2,2-dimethylpropanol-1, 1-hexanol, 2-ethylhexanol-1, 1-octanol, 1-pentadecanol, 3-methylbutanol-1, benzyl alcohol, alpha-phenethyl alcohol, beta-phenethyl alcohol, beta-naphthylethanol, beta-cyclohexyl ethanol, and beta-cyclopentyl ethanol.

Representative glycols include ethylene glycol; 1,2-propylene glycol; 1,3-propylene glycol; diethylene glycol; trimethylene glycol; neopentyl glycol; pentylene glycol-1,2; 1,2-butylene glycol; 1,3-butylene glycol; 1,6-hexamethylene glycol, heptamethylene glycol and decamtehylene glycol.

Glycols and other polyols containing only one primary hydroxyl group react as any primary alcohol. The additional hydroxyl group, if it is secondary, may form a ketone. Tertiary hydroxyl groups do not participate in the reaction.

The catalyst employed is a salt of an organic carboxylic acid having from about two to about thirty carbon atoms, and a metal of Group IIB of the Periodic Table, preferably cadmium or zinc. Any organic acid can be employed, and typical salts are the acetates, propionates, butyrates, oxalates, laurates, 2-ethyl hexoates, isooctoates, benzoates, cyclohexanoates, naphthenates, naphthoates, and phthalates of cadmium and zinc. These salts can be incorporated in the reaction mixture directly, or can be prepared in situ in the reaction mixture, such as by reaction of the corresponding oxide, i.e., cadmium or zinc oxide, and the appropriate organic acid, acid chloride or acid anhydride. The acid salts can also be prepared by direct reaction of the oxides and the acids, acid chlorides or anhydrides and then added to the reaction mixture.

It is preferable to employ the acid obtained from the alcohol used in the reaction so as to avoid contamination of the reaction product with the ester of the alcohol and the acid of the acid salt.

The reaction will proceed in the presence of a small amount of the salt. As little as 0.25% salt by weight of the reaction mixture is effective. Very satisfactory results are obtained with amounts within the range from 1% to 25%. Amounts in excess of about 50% by weight of the reaction mixture are usually not required, and generally do not increase the rate of reaction.

In carrying out the reaction, the alcohol itself serves as the reaction solvent. If the alcohol is extremely reactive, the reaction will proceed at a satisfactory rate at room temperature. Vicinal glycols, for example, react quickly at room temperature. Less reactive alcohols require a somewhat higher temperature, and in many cases it may be desirable to reflux the mixture as a satisfactory means of temperature control. In general, reaction temperatures within the range from about 25 to about 350° C. can be employed. Preferably, the temperature is within the range from about 80 to about 250° C. There is no critical upper limit to the reaction temperature, except that imposed by the decomposition temperatures of the reactants and reaction products. Thus, in the reaction as carried out the alcohol is in the liquid phase.

In the course of the reaction, hydrogen gas is liberated, and provision is therefore made for its escape or recovery without danger of explosion. Such metal ion as may be converted to free metal will be collected at the bottom of the reaction vessel. Upon completion of the reaction, the alcohol can be recovered by fractional distillation, and the ester separated from the free metal and any other precipitated material by decantation. Solid esters can be fractionally distilled to effect separation from by-products such as small amounts of ketones and aldehydes which may also be formed in some cases.

If the reaction is to be carried out at a temperature above the boiling point of the alcohol and other products present in the reaction mixture, it is important to carry out the reaction under pressure. The reaction can be carried out in a closed vessel, and this would ordinarily suffice, provided the vessel is capable of withstanding the pressures generated, due not only to the vapor pressure of the liquid present but also to the pressure of hydrogen gas.

The time required for the reaction to reach completion will depend upon the alcohol involved, the reaction temperature, and the amount of catalyst. The reaction conditions are readily adjusted so as to complete the reaction within about one-half to about ten hours.

As a supplemental catalyst, increasing the catalytic effect of the salt, there can also be included a neutral organic triphosphite, $(RO)_3P$. A small amount of the phosphite will suffice, usually from about 0.01 to about 1% by weight of the reaction mixture. The R groups of the phosphite can be aryl, alkyl, aralkyl, alkaryl, cycloaliphatic, and heterocyclic groups, and can be the same or a mixture of two or three of such groups. The R groups have from one to twenty carbon atoms, and the heterocyclic R groups have from one to three heterocyclic atoms other than nitrogen.

Exemplary are triphenyl phosphite, tricresyl phosphite, tri(dimethylphenyl) phosphite, tri-n-butyl phosphite, triisooctyl phosphite, tridodecyl phosphite, diisooctyl phenyl phosphite, isooctyl diphenyl phosphite, tri(p-t-octylphenyl) phosphite, tri(p-t-nonylphenyl) phosphite, tri(p-t-nonyl-o-cresyl) phosphite, tribenzyl phosphite, isobutyl dicresyl phosphite, isooctyl di(p-t-octylphenyl) phosphite, tri(2-ethylhexyl) phosphite, tri(2-cyclohexylphenyl) phosphite, tri-alpha-naphthyl phosphite, tri(diphenyl) phosphite, tri(2-phenylethyl) phosphite, trifuryl phosphite, tri-tetrahydrofurfuryl phosphite, tri-cyclohexyl phosphite, and tricyclopentyl phosphite.

The reaction is capable of operation as a batch process or as a continuous process. In a continuous process the reactants are blended, and passed into the reaction vessel, where they have a dwell time of the appropriate duration. A portion of the reaction mixture is withdrawn from the reaction vessel continuously or from time to time, and worked up, such as by fractional distillation, to recover the ester therefrom. The remainder of the mixture can be returned to the reaction vessel for reuse. It will be necessary to replenish the amount of catalyst that is consumed by conversion of metal ion to free metal, and the free metal formed in the reaction vessel also can be withdrawn from time to time.

The following examples in the opinion of the inventors represent the preferred embodiments of their invention.

*Example 1*

Decanol and 20% by weight of cadmium issooctoate were refluxed at temperatures from the boiling point initially to a final temperature of about 280° C. under a reflux condenser, and the reaction halted when hydrogen gas evolution had ceased. This required about six hours. Analysis of the reaction mixture showed that it was composed of 89.8% decyl decanoate, 4.28% decanal, 2.23% decanoic acid, and 4.5% decene.

*Example 2*

Benzyl alcohol and 20% by weight cadmium 2-ethyl hexoate were refluxed at temperatures ranging from the boiling point initially up to about 280° C. Hydrogen gas was evolved throughout the reaction. Analysis of the reaction mixture showed that it was composed of 89.6% benzyl benzoate, 1.61% 2-ethyl hexoic acid, 2.08% benzoic acid, and 6.1% benzaldehyde.

*Example 3*

Cadmium acetate (0.0377 mole) and isooctanol (0.69 mole) were refluxed under a reflux condenser for eight hours. By the end of this time, 0.089 mole of hydrogen gas had been liberated, free cadmium was formed, and the main reaction product was isooctyl isooctoate.

*Example 4*

A solution of cadmium-2-ethylhexoate in isooctanol (0.42 equivalent of cadmium, 1.3 moles isooctanol) was refluxed at 157° C. for five hours. At the conclusion of this time, 0.0895 equivalent of cadmium metal was recovered from the reaction mixture, and 0.75 mole of hydrogen gas had been liberated.

Distillation of a 100 gram portion of the reaction mixture gave 44 grams of distillate, corresponding to crude isooctyl isooctoate, boiling at 279° C.

*Example 5*

Isooctanol (2 moles), 2-ethyl hexoic acid (0.5 mole) and cadmium oxide (0.5 equivalent of cadmium) were put in a reactor equipped with reflux condenser and refluxed for ten hours. At the end of this time, 0.895 mole of hydrogen gas had been liberated, and 0.179 equivalent of free cadmium metal was formed. The reaction product was isooctyl isooctoate. By the time refluxing had concluded, the refluxing temperature had risen to 250° C.

A 75 gram portion of this reaction mixture was mixed with 0.58 mole of isooctanol, and the reaction mixture then refluxed again for two hours. Hydrogen gas (0.42 mole) was liberated together with 0.0285 equivalent of free cadmium metal.

There was then added a further portion, 0.385 mole, of isooctanol, and refluxing was resumed. Another 0.27 mole of hydrogen gas and 0.027 equivalent of cadmium metal were formed.

These experiments show that reuse of catalyst is quite feasible in a batchwise or continuous process. Addition of more alcohol results in a continuing of the reaction, after all of the alcohol initially added has been consumed. The reaction is slowed as cadmium metal is liberated, due to loss of catalyst, so that it would be desirable in a continuous process to add an amount of cadmium salt or other salt to the reaction mixture equivalent to that destroyed by the formation of cadmium or other metal.

*Example 6*

2-ethyl hexoic acid (0.5 mole), 0.25 mole of zinc oxide, and 0.69 mole of isooctanol were placed in a reaction vessel equipped with reflux condenser, and refluxed for ten hours. At the end of this time, the reflux temperature had risen to 200° C., and 0.013 mole of hydrogen gas had been liberated. The main reaction product was isooctyl isooctoate. The temperature was increased to 295° C., whereupon an additional 0.357 mole of hydrogen gas was liberated. A gray precipitate, free zinc metal, was formed at the bottom of the vessel. A further proportion of isooctyl isooctoate formed in the supplemental reaction carried out at temperatures up to 295° C.

*Example 7*

Benzoic acid (0.5 mole), 0.235 mole of cadmium oxide and 1.33 moles of isooctanol were put in a reaction vessel equipped with reflux condenser, and refluxed for five hours. In the course of this time, 1.34 moles of hydrogen gas and 0.19 equivalent of cadmium metal were formed. The reaction temperature ranged from an initial 180° C. to a final temperature of 270° C. The reaction mixture was subjected to distillation. From 80 grams of reaction mixture there was obtained 68 grams of distillate having a boiling range of 270 to 301° C. The principal reaction product was isooctyl isooctoate.

*Example 8*

2-ethyl hexoic acid (0.5 mole), 0.235 mole of cadmium oxide, and 0.885 mole of neopentyl glycol were refluxed for ten hours. At the end of this time, 0.224 mole of hydrogen gas had been formed, and 0.0805 equivalent of cadmium metal. Volatile liquid which boiled off during the reaction was recovered.

The reaction mixture was subjected to distillation. Two esters were recovered, which apparently corresponded to the expected mono- and di-esters assuming the two primary hydroxyl groups of the neopentyl glycol had been converted to acyl groups.

*Example 9*

Example 8 was repeated, employing ethylene glycol. Hydrogen was evolved at room temperature. Similar results were obtained.

The reaction temperature was increased, as in Example 8, and the mono- and di-ester products were obtained, mixed with some polymeric ester.

*Example 10*

One mole of capryl alcohol (octanol-2) and 20% by weight of cadmium isooctoate were refluxed at temperatures from 133° up to 292° C. Metallic cadmium (15.6% of the cadmium metal used) was obtained, and 7.1 liters of hydrogen was evolved per 100 g. of alcohol over an 8 hour period. Analysis of the reaction mixture showed 19.98% methyl hexyl ketone, and the remainder unreacted alcohol.

The process of the invention is useful for the direct synthesis of esters from alcohols, where the ester desired is the ester of that alcohol and of the acid corresponding to the oxidation product of that alcohol. In effect, the alkyl group of the resulting acid has one less carbon atom than the alkyl group of the alcohol. The method thus provides a convenient, one-step synthesis of esters, which may be rather convenient where the acids of corresponding structure are not readily available, or where the preparation of the acid from the alcohol may proceed in poor yield because of rearrangement, loss of branched-chain groups, and the like.

The process of the invention is also useful in going down the series from a higher alcohol to a lower alcohol, by the following series of reactions involving the Hofmann rearrangement:

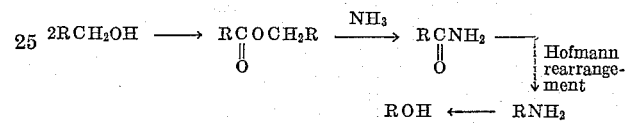

This synthesis is a simplified one, as compared to the usual synthesis, inasmuch as it permits going directly from the alcohol to the ester, avoiding the intermediate formation of the acid, which is otherwise a necessary step, and at the same time it avoids the necessity of an additional alcohol reactant in forming the ester, for the alcohol which is to be stepped-down itself serves as the esterifying alcohol. The reaction is quite easily carried out in a laboratory. Furthermore, the stepped-down alcohol which is recovered as the final product can itself be esterified, if desired, by the reaction so as to form an ester product.

We claim:

1. A process for converting primary alcohols having from two to about fifty-one carbon atoms, and having in the molecule at least one $CH_2OH$ group, to esters, which comprises reacting the alcohol with itself in the liquid phase in the presence of a salt of an organic carboxylic acid having from two to about thirty carbon atoms and a metal of Group IIB of the Periodic Table, at a temperature within the range from about 25 to about 350° C. to form an ester of that alcohol and the acid oxidation product of that alcohol.

2. A method in accordance with claim 1, in which the salt is a cadmium salt.

3. A method in accordance with claim 1 in which the salt is a zinc salt.

4. A method in accordance with claim 1 in which the salt is a salt of the organic aliphatic acid formed from the alcohol in the said process.

5. A method in accordance with claim 1 in which the alcohol is a primary alkyl alcohol.

6. A method in accordance with claim 1 in which the alcohol is a polyhydric alcohol.

7. A process for converting secondary alcohols having from two to about fifty-one carbon atoms and having in the molecule at least one CHOH group to ketones which comprises dehydrogenating the alcohol in the liquid phase in the presence of a salt of an organic carboxylic acid having from two to about thirty carbon atoms, and a metal of Group IIB of the Periodic Table at a temperature within the range from about 25 to about 350° C. to form hydrogen and the ketone of that alcohol.

8. A method in accordance with claim 7 in which the salt is a cadmium salt.

9. A method in accordance with claim 7 in which the salt is a zinc salt.

References Cited by the Examiner

UNITED STATES PATENTS

| | | | |
|---|---|---|---|
| 1,895,516 | 1/33 | Lazier | 260—596 |
| 1,949,425 | 3/34 | Lazier | 260—495 |
| 2,178,761 | 11/39 | Lazier | 260—495 |
| 2,354,683 | 8/44 | Hull | 260—596 |
| 2,697,730 | 12/54 | Mecorney et al. | 260—596 |

OTHER REFERENCES

Noller: Chemistry of Organic Compounds, 1951, pages 92 and 93.

CHARLES B. PARKER, *Primary Examiner*.

A. H. WINKELSTEIN, *Examiner*.